(12) United States Patent
Mawatari

(10) Patent No.: US 6,513,702 B2
(45) Date of Patent: Feb. 4, 2003

(54) AUTOMATIC WAVE SOLDERING APPARATUS AND METHOD

(75) Inventor: Shohei Mawatari, Tokyo (JP)

(73) Assignee: Senju Metal Industry Co., Ltd., Tokyo (JP)

(*) Notice: Subject to any disclaimer, the term of this patent is extended or adjusted under 35 U.S.C. 154(b) by 0 days.

(21) Appl. No.: 09/983,188

(22) Filed: Oct. 23, 2001

(65) Prior Publication Data

US 2002/0047039 A1 Apr. 25, 2002

(30) Foreign Application Priority Data

Oct. 23, 2000 (JP) .................................. 2000-322717
Oct. 26, 2000 (JP) .................................. 2000-326468

(51) Int. Cl.⁷ .............................. B23K 31/02; B23K 1/08
(52) U.S. Cl. ........................................ 228/260; 228/37
(58) Field of Search .......................... 228/256, 37, 260, 228/33

(56) References Cited

U.S. PATENT DOCUMENTS

| | | | |
|---|---|---|---|
| 4,101,066 A | * 7/1978 | Corsaro et al. | 228/180.1 |
| 4,139,143 A | * 2/1979 | Gumprecht | 228/180.1 |
| 4,447,001 A | * 5/1984 | Allen et al. | 228/260 |
| 4,530,457 A | * 7/1985 | Down | 228/180.1 |
| 4,568,016 A | * 2/1986 | Payne | 228/180.1 |
| 4,886,201 A | * 12/1989 | Deambrosio et al. | 228/37 |
| 5,156,324 A | * 10/1992 | Hueste et al. | 228/180.1 |
| 5,240,169 A | * 8/1993 | Gileta | 228/180.1 |
| 5,720,426 A | * 2/1998 | Fothen | 228/260 |
| 5,725,143 A | * 3/1998 | Leturmy | 118/410 |
| 5,772,101 A | * 6/1998 | Nishimura et al. | 228/260 |
| 5,901,899 A | * 5/1999 | Flache | 118/429 |

FOREIGN PATENT DOCUMENTS

| | | | |
|---|---|---|---|
| EP | 0206231 A2 | * | 12/1986 |
| EP | 0736354 A2 | * | 10/1996 |
| JP | 58-178593 | | 10/1983 |
| JP | 62-35857 | | 8/1987 |
| JP | 62-46270 | | 10/1987 |
| JP | 406320261 A | * | 11/1994 |

OTHER PUBLICATIONS

US 2002/0047039 A1 Mawatari (Feb. 25, 2002).*
NN7708960 IBM Technical Disclosure Bulletin (Aug. 1, 1977).*

* cited by examiner

Primary Examiner—Tom Dunn
Assistant Examiner—Kiley Stoner
(74) Attorney, Agent, or Firm—Wenderoth, Lind & Ponack, L.L.P.

(57) ABSTRACT

An automatic wave soldering apparatus includes a solder reservoir for holding a supply of molten solder and a solder nozzle vertically disposed in the solder reservoir to establish a solder wave through which a printed circuit board is moved. A pair of trapezoidal elements are secured within the nozzle. A Y-shaped baffle is disposed between the trapezoidal elements to form upwardly inclined narrowed upstream and downstream outlets. The upstream and downstream outlets are inclined at an acute angle against and in the direction of movement of the printed circuit board, respectively. A pair of valves are disposed at opposite sides of the baffle to selectively open and close the outlets. The bottom side of each of the trapezoidal elements forms a step to promote turbulence in the solder wave. The trapezoidal elements and the baffle collectively serve to increase the flow velocity of the molten solder through the outlets.

7 Claims, 8 Drawing Sheets

AUTOMATIC WAVE SOLDERING APPARATUS AND METHOD

BACKGROUND OF THE INVENTION

The present invention relates to an apparatus and method for automatically wave soldering workpieces such as printed circuit boards.

A usual automatic wave soldering apparatus includes a pair of endless chain conveyors driven to advance a printed circuit board at a constant speed from the entrance to exit ends of the apparatus. With the printed circuit board held by gripping fingers, the board is first carried to a fluxer where a foam or spray of flux is applied to the underside of the board. The printed circuit board is then carried over preheaters where the temperature of each board is elevated to approximately 110° C. to 130° C. so as to evaporate excess flux solvent, activate the flux and minimize thermal shock to the printed circuit board. After the printed circuit board is brought to such a preheat temperature, the board passes over a solder reservoir to receive solder. The board is finally transported to a cool down zone where the solder is cooled to solidify.

Typically, two solder waves are established in the solder reservoir. One of the two solder waves is a turbulent wave, and the other is a non-turbulent wave. The turbulent wave allows the solder to reach component terminations and other hard to reach areas to be soldered, but bridges and icicles of solder remain on the underside of a printed circuit board and can cause a short circuit or damage to sensitive electrical components. Such bridges and icicles can be removed in the subsequent non-turbulent wave.

Various attempts have been made to promote turbulence. For example, Japanese patent publication No. 62-46270 discloses a plurality of vanes disposed in a solder nozzle and interconnected by a rod. The rod and thus, the vanes are rotated or reciprocated by means of a motor to cause molten solder to flow in a turbulence wave. Japanese patent publication No. 62-35857 discloses a cylindrical body disposed in the upper end of a solder nozzle. A multiplicity of openings are defined in the cylindrical body. While the cylindrical body is rotated by a motor, molten solder is forced through the openings to thereby promote turbulence in a solder wave. A disadvantage with these designs is that the rotational speed of the motor fluctuates due to heat degenerated in a solder reservoir in which the motor is disposed. The heat also reduces the service life of the motor. Another problem is that the vanes and other movable turbulent means tend to cause molten solder to spatter. Such spattering creates bridges, particularly between closely adjacent conductors.

Japanese laid-open patent publication NO. 58-178593 discloses two waves established in two respective solder nozzles without the use of vanes and other movable turbulent means. The solder waves are both smooth or laminar waves. It has been found that such laminar waves are unable to cause molten solder to fill through holes through which leads of electronic components extend.

Accordingly, it is an object of the present invention to provide an automatic wave soldering apparatus and method which promote turbulence in a solder wave without the use of a motor or similar means and which allow molten solder to fill through holes and reach component terminations and other hard to reach areas to be soldered, regardless of orientations of selected areas of electronic components to be soldered.

SUMMARY OF THE INVENTION

According to one aspect of the present invention, there is provided an apparatus for wave soldering a printed circuit board, which comprises a solder reservoir for holding a supply of molten solder, a solder nozzle disposed in the solder reservoir to establish a solder wave, and means for promoting turbulence in the solder wave and for increasing flow velocity of the molten solder. The turbulent means is disposed in the solder nozzle to thereby provide at least one upwardly inclined outlet through which the molten solder emerges at an angle relative to the direction of movement of the printed circuit board.

In a preferred embodiment, the turbulent means includes a trapezoidal element secured within the solder nozzle. The trapezoidal element has horizontal top and bottom sides. This bottom side acts as a step to cause molten solder to flow in a turbulent wave. The trapezoidal element is fixed in position and thus, will not cause molten solder to spatter. Also, this arrangement eliminates the need for a motor to create turbulence. The solder nozzle is composed of a pair of upstream and downstream vertical walls, and a pair of opposite side walls connected to the vertical walls. Preferably, the downstream vertical wall has an inclined upper end. The inclined upper end of the vertical wall and the trapezoidal element collectively reduce the sectional area of the solder nozzle to thereby increase the flow velocity of the molten solder.

In a preferred embodiment, the turbulent means includes a baffle disposed between the upstream and downstream vertical walls to form an upwardly inclined upstream outlet between the baffle and the upstream vertical wall and an upwardly inclined downstream outlet between the baffle and the downstream vertical wall, and a pair of valves disposed on opposite sides of the baffle and adapted to selectively open and close the upstream and downstream outlets. The upwardly inclined upstream outlet is inclined at an acute angle against the direction of movement of the printed circuit board, whereas the upwardly inclined downstream outlet is inclined at an acute angle in the direction of movement of the printed circuit board. This arrangement allows molten solder to reach all areas to be soldered, regardless of the orientations of electrical components on a printed circuit board.

According to another aspect of the present invention, there is provided a method of wave soldering a printed circuit board, which comprises selectively establishing at least either one of a turbulent wave which flows counter to the direction of movement of the printed circuit board, and a turbulent wave which flows in the direction of movement of the printed circuit board, establishing a substantially non-turbulent solder wave, and passing the printed circuit board along a predetermined path to allow the printed circuit board to successively engage at least a selected one of the turbulent waves and the non-turbulent wave.

BRIEF DESCRIPTION OF THE DRAWINGS

The above and other objects, features and advantages of the present invention will become more apparent from a reading of the following description of preferred embodiments when taken in conjunction with the accompanying drawings, in which.

DETAILED DESCRIPTION OF THE INVENTION

Figure 1:
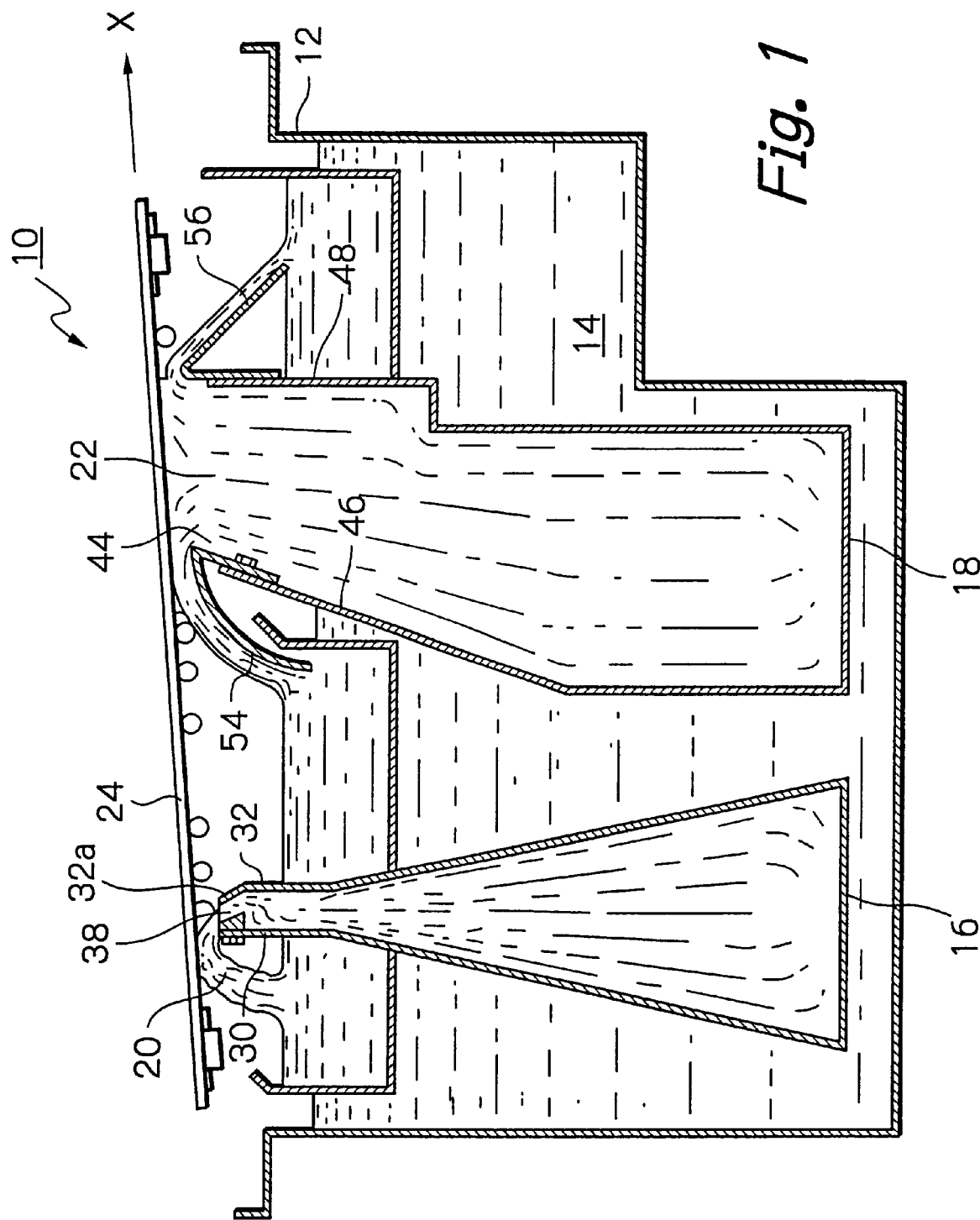
FIG. 1 is a sectional view through an automatic wave soldering apparatus wherein first and second solder nozzles are disposed in a solder reservoir.

Referring first to FIG. 1, there is shown an automatic wave soldering apparatus according to one embodiment of the present invention and generally designated at 10. The wave soldering apparatus 10 generally includes a solder reservoir 12 for holding a supply of molten solder 14, first and second solder nozzles 16, 18 extending up above the solder level, and pumps (not shown) for pumping the molten solder through the nozzles 16, 18 to form solder waves 20, 22. A printed circuit board 24 is passed along a path, as shown by the arrow X in FIG. 1, above the solder reservoir 12. The path is sloped upwards so that at least the underside of the circuit board 24 passes through the solder waves.

Figure 2:
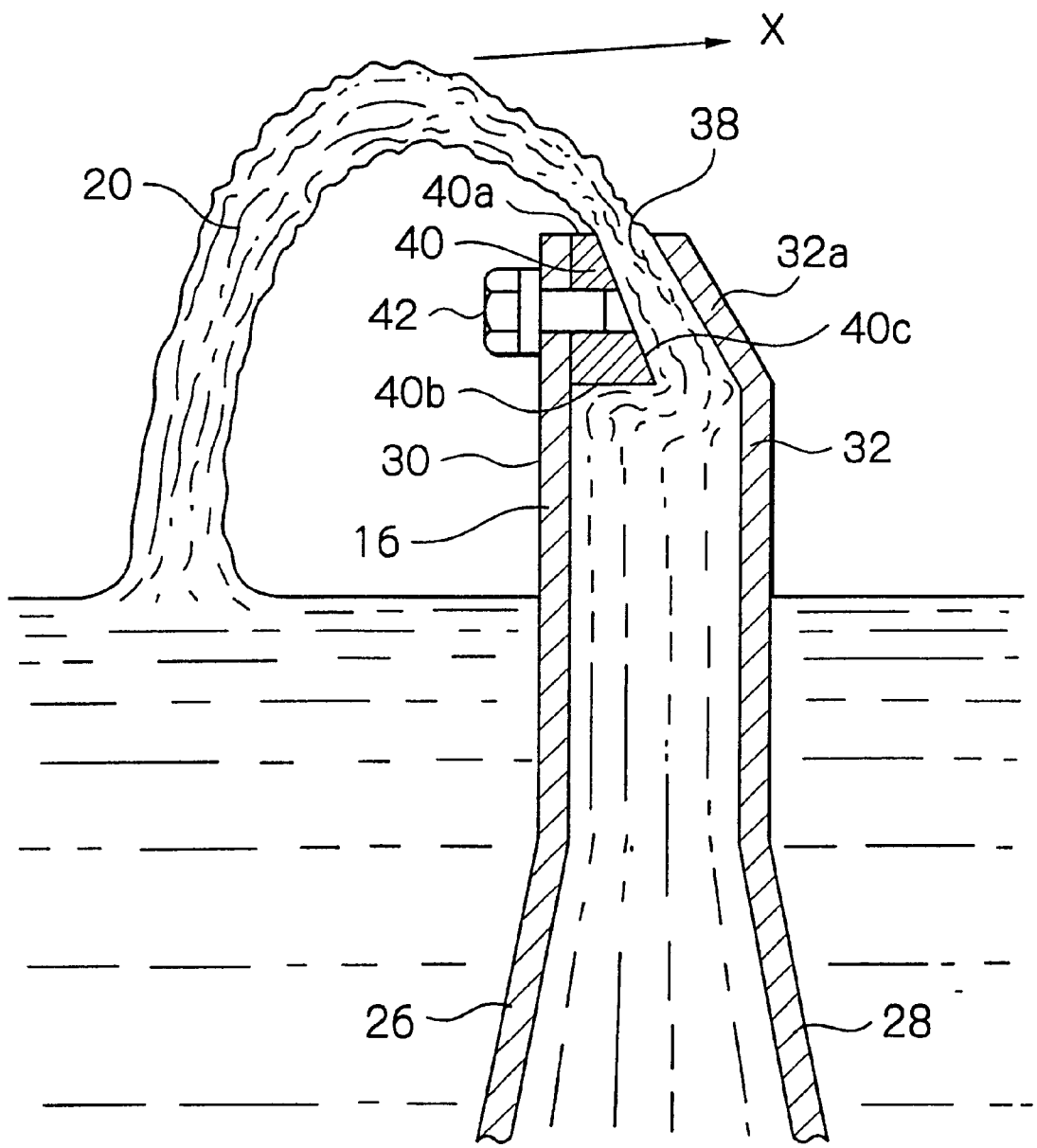
FIG. 2 is an enlarged sectional view of the first solder nozzle shown in FIG. 1.
Figure 3:
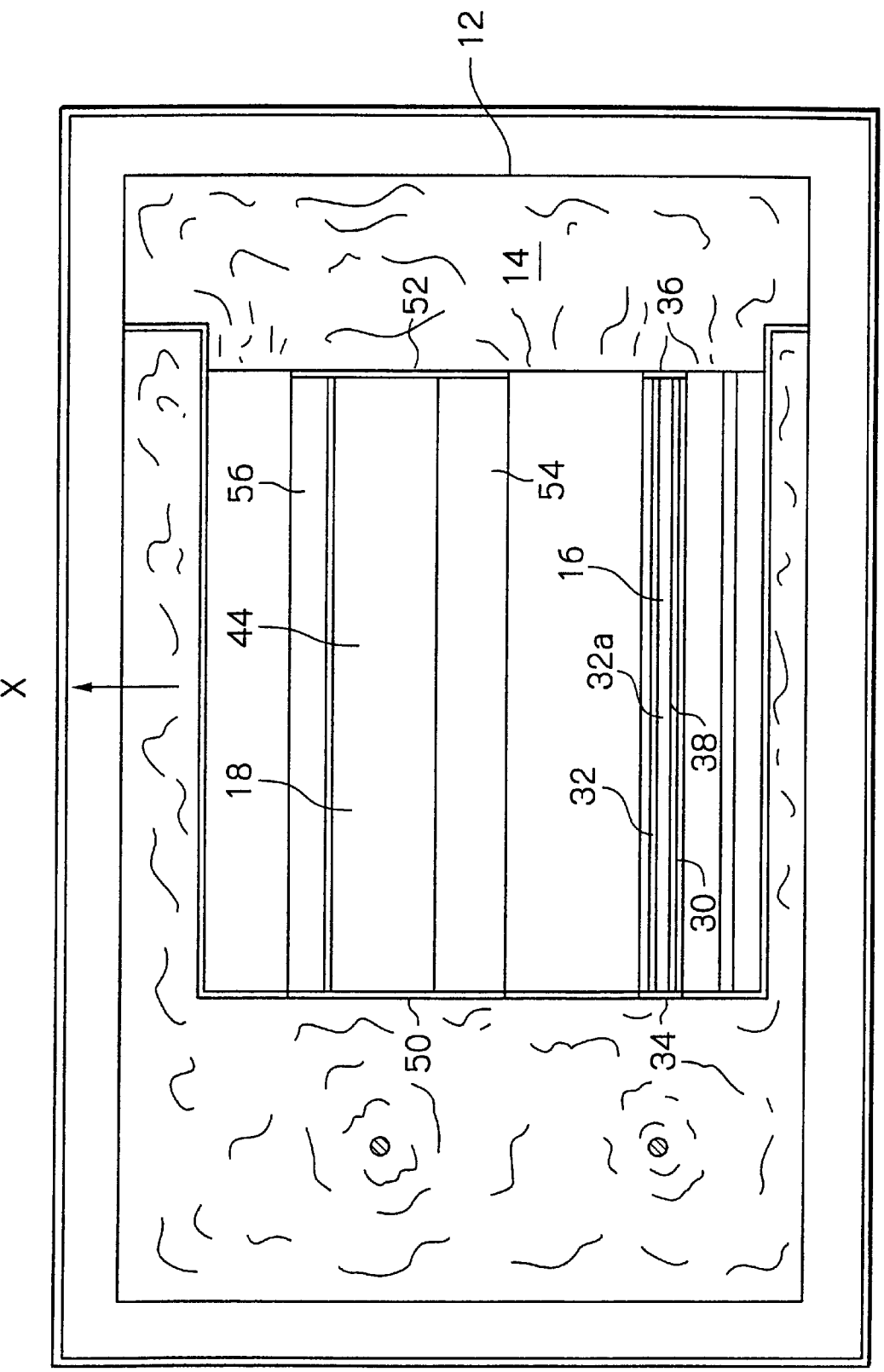
FIG. 3 is a top view of the automatic wave soldering apparatus.

As shown in FIG. 2, the first solder nozzle 16 is composed of a pair of upstream and downstream converging walls 26, 28, a pair of upstream and downstream vertical walls 30, 32 extending upwardly from the respective converging walls 26, 28, and a pair of side walls 34, 36 connected to opposite sides of the converging walls 26, 28 and the vertical walls 30, 32. The vertical walls 30, 32 collectively form a narrowed outlet 38. In the illustrated embodiment, the downstream vertical wall 32 has an upper end 32a that is inclined against the upper end of the upstream vertical wall 30. A generally trapezoidal element 40 is secured to the upper end of the upstream vertical wall 30 by a bolt 42. The trapezoidal element 40 has horizontal top and bottom sides 40a, 40b. The top side 40a is flush with the upper end of the upstream vertical wall 30, and the bottom side 40b forms a step to cause the molten solder 14 to flow in a turbulent wave. The trapezoidal element 40 has a sloping side 40c that is inclined at an angle substantially equal to or slightly larger than the angle of inclination of the inclined upper end 32a of the downstream vertical wall 32 so that a transverse slit is formed in the nozzle outlet 38. This arrangement increases the flow velocity of the molten solder 14 as it flows out of the nozzle outlet 38. Advantageously, the inclined upper end 32a of the downstream vertical wall 32 and the trapezoidal element 40 collectively form means for creating or promoting turbulence and also, increasing the flow velocity of the molten solder through the outlet 38.

The second solder nozzle 18 is provided downstream of the first solder nozzle 16. The second solder nozzle 18 has a nozzle outlet 44 that is much wider than that of the outlet 38 so that the solder wave 22 is a smooth turbulent free wave. As shown better in FIG. 1, the second solder nozzle 18 is composed of a contoured upstream wall 46, a contoured downstream wall 48, and a pair of side walls 50, 52 connected to opposite sides of the upstream and downstream walls 46, 48. A downwardly sloping front guide 54 is connected to the upper end of the upstream wall 46. A downwardly inclined rear guide 56 is also connected to the upper end of the downstream wall 48. The two guides allow the molten solder to flow back into the solder reservoir 12.

In use, a pair of endless chain conveyors (not shown) are driven to advance the printed circuit board 24 at a constant speed from the entrance to exit ends of the apparatus 10. The circuit board 24 is first carried to a fluxer (not shown) where a foam or spray of flux is applied to the underside of the printed circuit board 24. The printed circuit board 24 is then preheated so as to evaporate excess flux solvent, activate the flux and minimize thermal shock to the printed circuit board 24. The printed circuit board 24 is thereafter transported to the solder reservoir 12. The printed circuit board 24 is first passed through the turbulent and jet wave 20 established in the first solder nozzle 16. The degree of turbulence is sufficient to cause the molten solder to be forced up on either side of electronic components mounted on the printed circuit board. Also, the molten solder is caused to fill through holes on the circuit board 24 and reach component terminations and other hard to reach areas, such as crevices and corners, to be soldered. The printed circuit board 24 is thereafter moved through the smooth turbulent free solder wave 22 to remove or eliminate bridges and icicles which may be formed between adjacent terminals and conductor paths. The printed circuit board 24 is finally transported to a cool down zone (not shown) where the solder is cooled to solidify.

Figure 4:
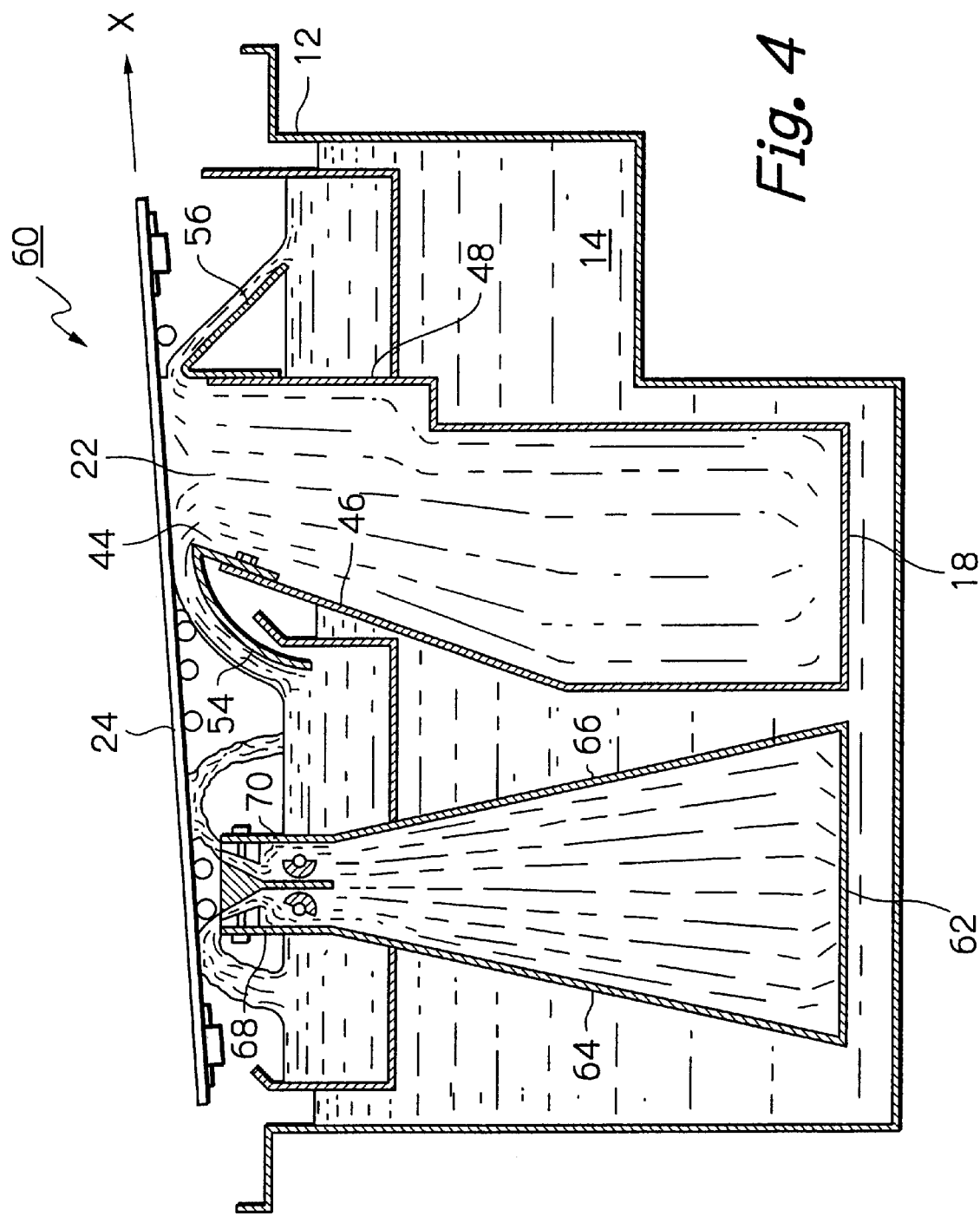
FIG. 4 is a view similar to that of FIG. 1, but showing another embodiment of the automatic wave soldering apparatus according to the present invention.
Figure 5:
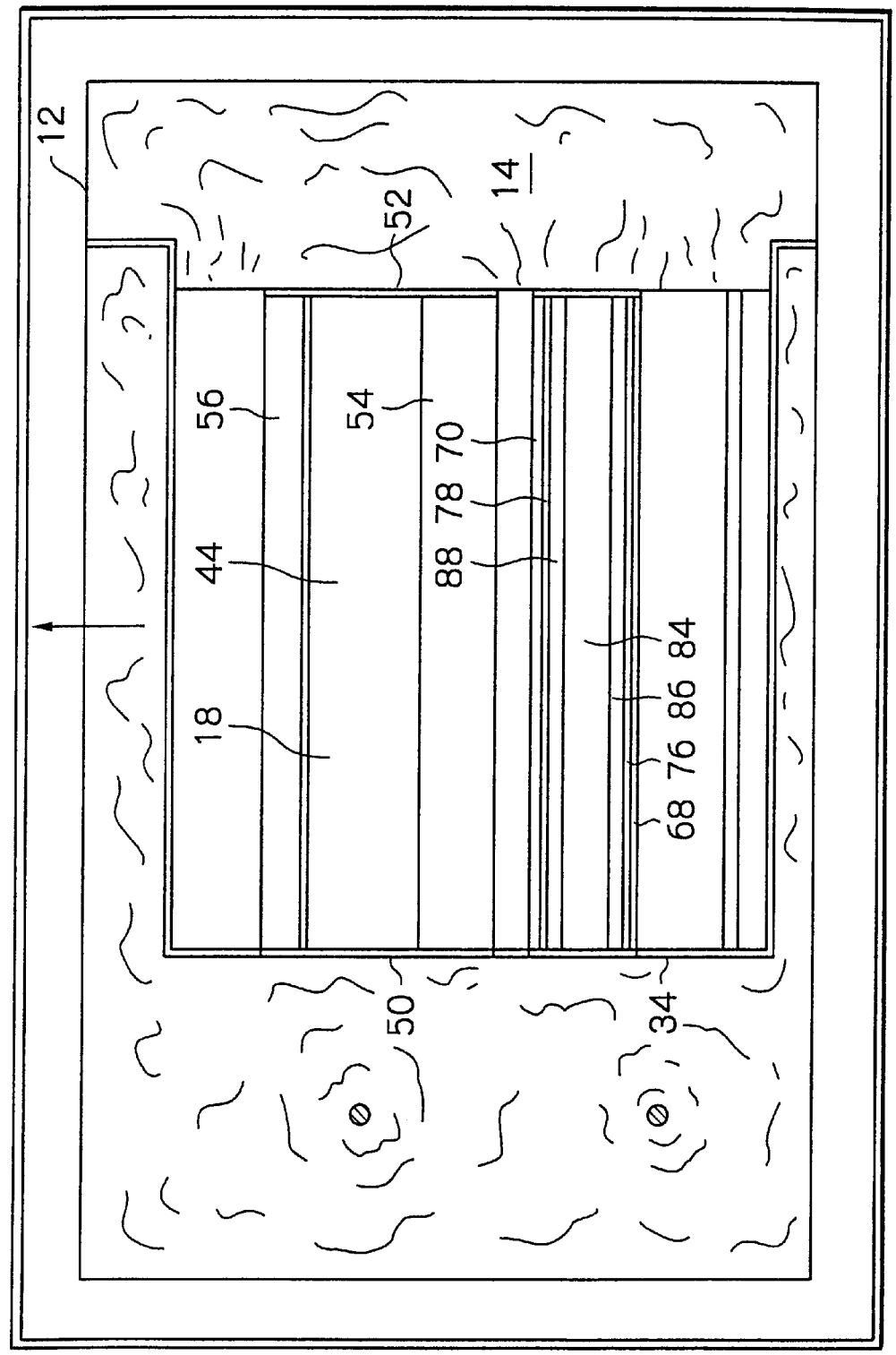
FIG. 5 is a top view of the automatic wave soldering apparatus shown in FIG. 4.

Referring next to FIG. 4, there is shown an automatic wave soldering apparatus according to another embodiment of the present invention and generally indicated at 60. Like reference numerals indicate like or corresponding parts used in the previous embodiment. In this embodiment, the flow of molten solder counter to the direction of movement of the printed circuit board and in the direction of the board movement can be varied independently as may be necessary to control the solder flow. Advantageously, this arrangement avoids coldly solder spots and shadow regions, regardless of orientations of electronic components on the printed circuit board.

As in the previous embodiment, a first solder nozzle 62 is composed of a pair of upstream and downstream converging walls 64, 66, a pair of upstream and downstream vertical walls 68, 70 extending upwardly from the respective converging walls 64, 66, and a pair of side walls 72, 74 connected to opposite sides of the converging walls 64, 66 and the vertical walls 68, 70. In this embodiment, however, a pair of trapezoidal elements 76, 78 are secured to the upstream and downstream vertical walls 68, 70 by respective bolts 80, 82. The trapezoidal elements 76, 78 are identical in structure to that of the previous embodiment and have horizontal top and bottom sides 76a, 76b and 78a, 78b, and sloping sides 76c, 78c extending between the top and bottom sides. The bottom sides 76b, 78b of the trapezoidal elements 76, 78 form steps and serve to cause the molten solder to flow in a turbulent wave. A baffle 84 is positioned between the upper end of the upstream vertical wall 68 and the upper end of the downstream vertical wall 70. An upstream outlet 86 is formed between the upstream vertical wall 68 and the baffle 84. Likewise, a downstream outlet is formed between the downstream vertical wall 70 and the baffle 84. The cross sectional area of each of the outlets 86, 88 is much smaller that that of part of the vertical walls 68, 70 below the trapezoidal elements 76, 78. Thus, the flow velocity of the molten solder is significantly increased as it passes through the outlets 86, 88.

The baffle 84 has a Y-shaped cross section and extends in a direction transverse to the direction of movement of the printed circuit board 24. A pair of upstream and downstream butterfly valves 90, 92 are disposed at opposite sides of the baffle 84 and below the outlets 86, 88. The butterfly valves 90, 92 include respective rotary shafts 94, 96 extending in a direction transverse to the direction of movement of the printed circuit board 24 and rotatable about their own axes, and semicircular valve elements 98, 100 secured to the shafts.

The remaining parts are identical in structure and function to those shown in the embodiment shown in FIG. 1 and will not be described herein.

Figure 6:
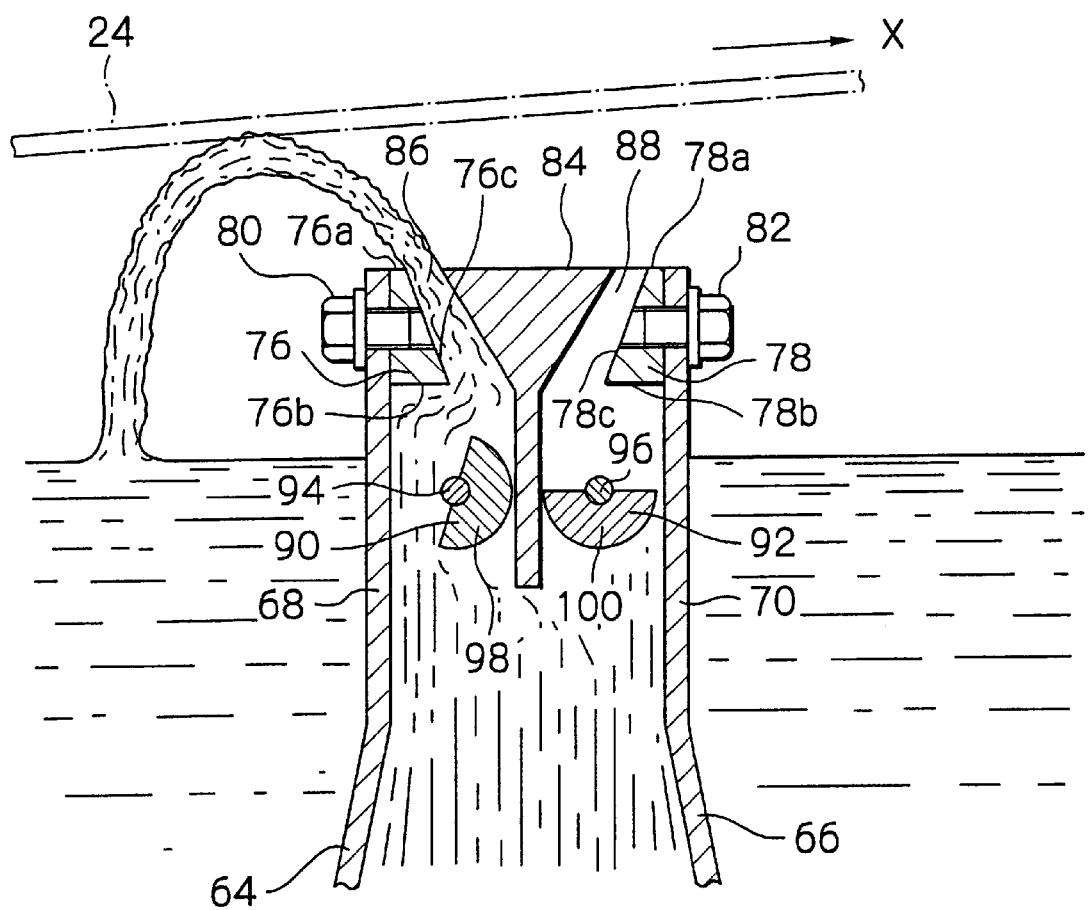
FIG. 6 is an enlarged sectional view showing the manner in which molten solder emerges at an acute angle against the direction of movement of a printed circuit board.
Figure 7:
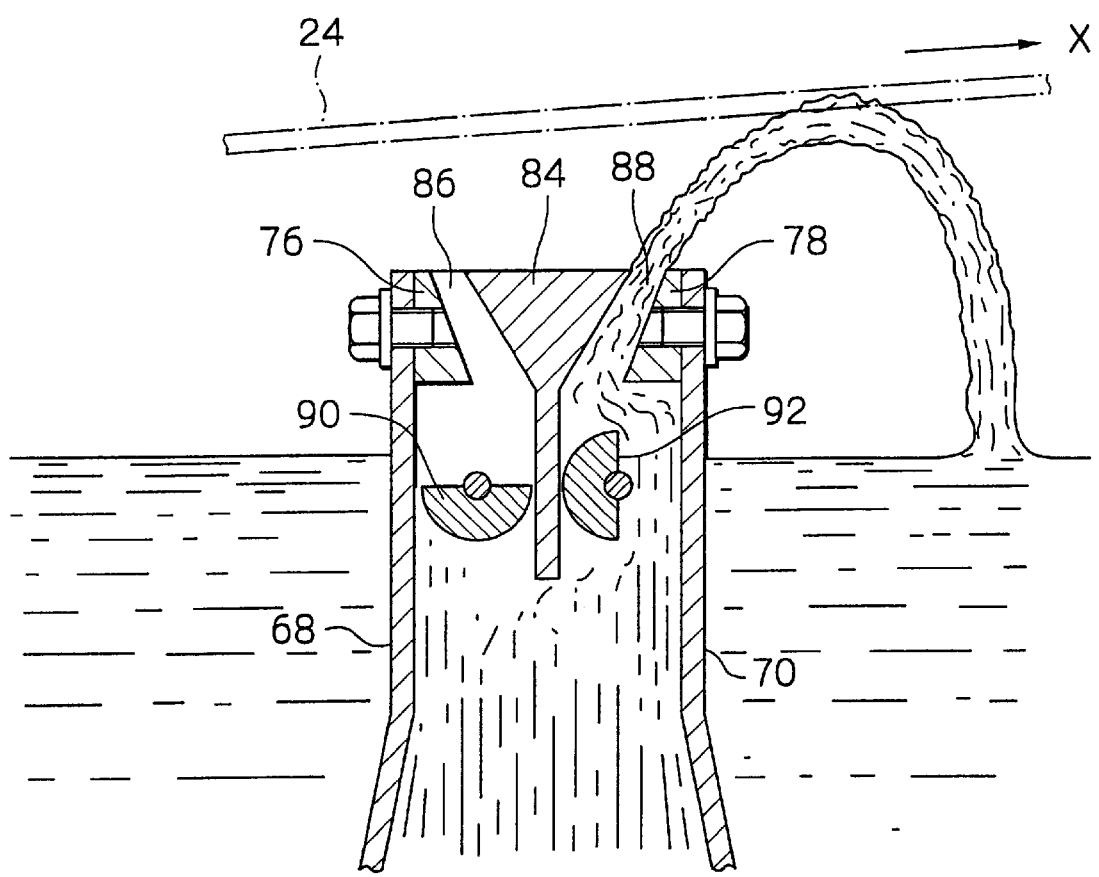
FIG. 7 is a view similar to that of FIG. 6, but showing the manner in which molten solder emerges at an acute angle in the direction of movement of a printed circuit board.
Figure 8:
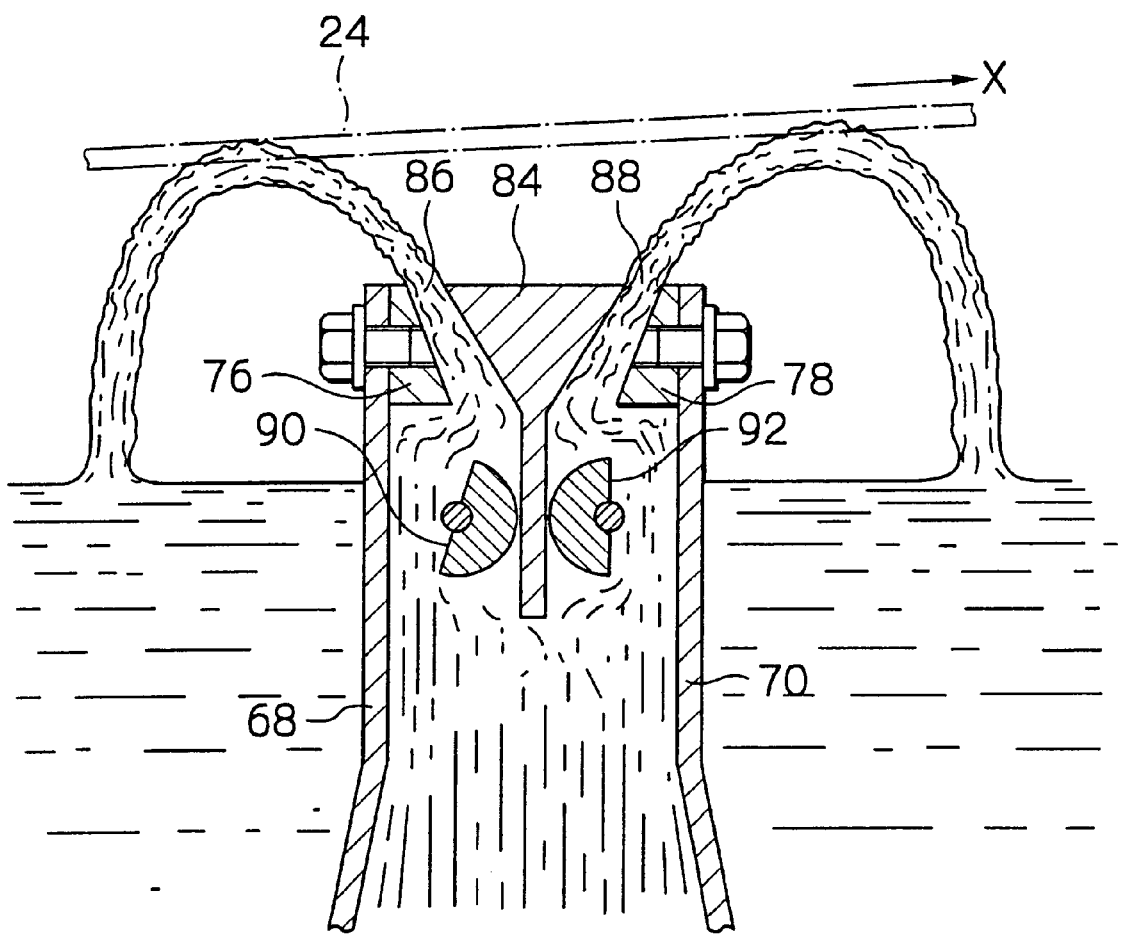
FIG. 8 is a view similar to that of FIG. 6, but showing the manner in which molten solder emerges at an acute angle both against the direction of movement of a printed circuit board and in a direction counter to the direction of movement of the printed circuit board.

With the upstream butterfly valve 90 open, and the downstream butterfly valve 92 closed as shown in FIG. 6, the molten solder emerges at an acute angle in a direction opposite to the direction of movement of the printed circuit board 24. This arrangement is suitable for a printed circuit board wherein selected areas of electronic components to be soldered are oriented in the direction of movement of the printed circuit board. With the upstream butterfly valve 90 closed, and the downstream butterfly valve open 92 as shown in FIG. 7, the molten solder emerges at an acute angle in the direction of movement of the printed circuit board 24. This arrangement is suitable for a printed circuit board wherein selected areas of electronic components to be soldered are oriented against the direction of movement of the printed circuit board. With the both valves 90, 92 open as shown in FIG. 8, the molten solder emerges at an acute angle both in and against the direction of movement of the printed circuit board. This arrangement is suitable for a printed circuit board wherein selected areas of electronic components, such as quad flat packs, to be soldered are oriented both in and against the direction of movement of the printed circuit board. Selective opening and closing of the valves allow the molten solder to fill through holes, crevices, corners and other hard to reach areas to be soldered, regardless of orientations of electronic components on the printed circuit board.

Although the present invention has been described with respect to its preferred embodiments, it is to be understood that various changes and modifications may be made without departing from the scope of the invention as defined by the appended claims.

What is claimed is:

1. A method of wave soldering a printed circuit board, the method comprising:

selectively establishing at least either a turbulent wave that flows counter to the direction of movement of the printed circuit board or a turbulent wave that flows in the direction of movement of the printed circuit board;

establishing a substantially non-turbulent solder wave;

passing the printed circuit board over at least a selected one of said turbulent waves; and subsequently passing the printed circuit board over said substantially non-turbulent wave.

2. A method of wave soldering a printed circuit board, the method comprising:

pumping heated molten solder up through a first solder nozzle;

selectively opening and closing valve means disposed within said first solder nozzle so as to establish at least either a turbulent wave that flows counter to the direction of movement of the printed circuit board or a turbulent wave that flows in the direction of movement of the printed circuit board;

pumping the heated molten solder up through a second solder nozzle so as to establishing a substantially non-turbulent solder wave;

passing the printed circuit board over at least a selected one of said turbulent waves; and subsequently passing the printed circuit board over said substantially non-turbulent wave.

3. An apparatus for wave soldering a printed circuit board, said apparatus comprising:

a solder reservoir for holding a supply of molten solder;

a solder nozzle disposed in said solder reservoir and designed to establish a solder wave over which the printed circuit board is conveyed; and means for promoting turbulence in the solderwave and increasing flow velocity of the molten solder, said means for promoting turbulence including a baffle disposed in said solder nozzle, an upwardly inclined upstream outlet defined in an upstream side of the baffle and inclined at an acute angle against the direction of movement of the printed circuit board, an upwardly inclined downstream outlet defined in a downstream side of the baffle and inclined at an acute angle in the direction of movement of the printed circuit board, and valve means disposed within said solder nozzle for selectively opening and closing said upstream and downstream outlets.

4. The apparatus of claim 3, wherein said valve means comprises upstream and downstream valve elements disposed at said upstream and downstream sides of said baffle, respectively and operatively associated with said upstream and downstream outlets, respectively.

5. The apparatus of claim 3, wherein said solder nozzle includes upstream and downstream walls and opposite side walls connected to said upstream and downstream walls, and said means for promoting turbulence comprises upstream and downstream trapezoidal elements secured to said upstream and downstream walls, respectively, said upwardly inclined upstream and downstream outlets being defined between said upstream trapezoidal element and said baffle and between said downstream trapezoidal element and said baffle, respectively.

6. The apparatus of claim 5, wherein each of said upstream and downstream trapezoidal elements includes substantially horizontal top and bottom sides, and a sloping side extending between said top and bottom sides, said bottom side of said trapezoidal elements being associated with said upstream and downstream walls of said solder nozzle so as to form steps.

7. The apparatus of claim 3 wherein said baffle has a substantially Y-shaped section.

* * * * *